2 Sheets—Sheet 1.
A. J. JOHNSON & C. O. EVARTS.
Measuring and Indicating Faucet.
No. 201,533. Patented March 19, 1878.
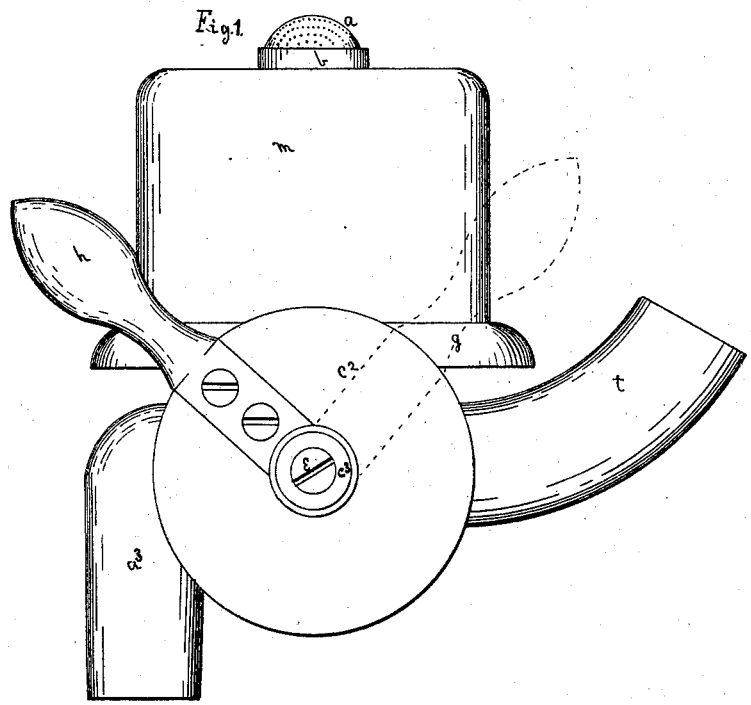
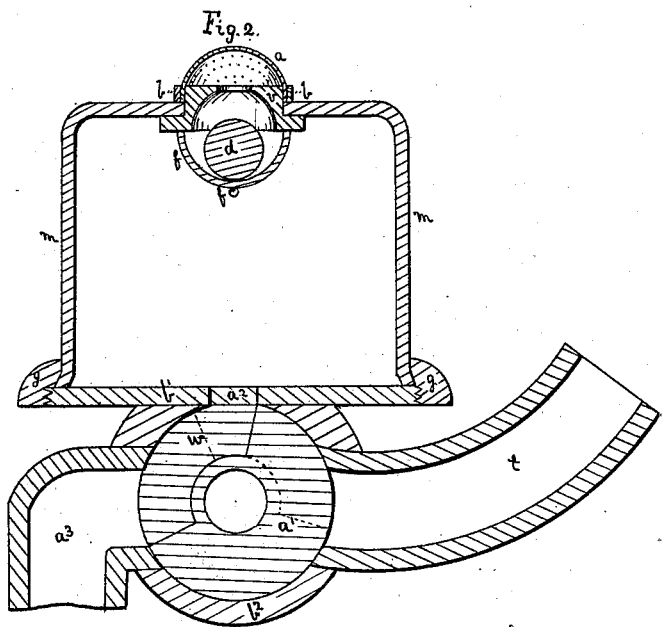

2 Sheets—Sheet 2.
A. J. JOHNSON & C. O. EVARTS.
Measuring and Indicating Faucet.
No. 201,533. Patented March 19, 1878.
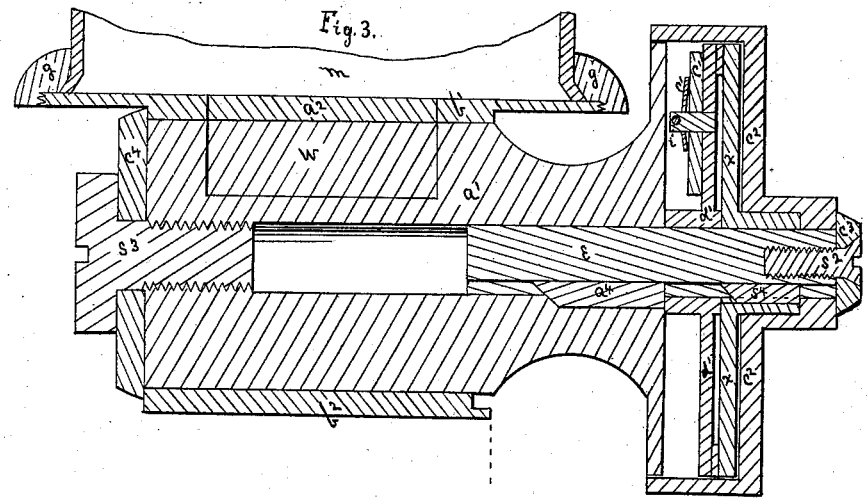
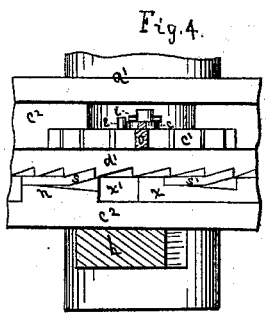
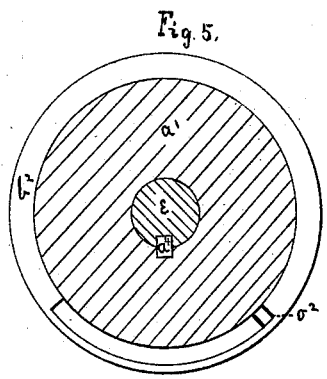
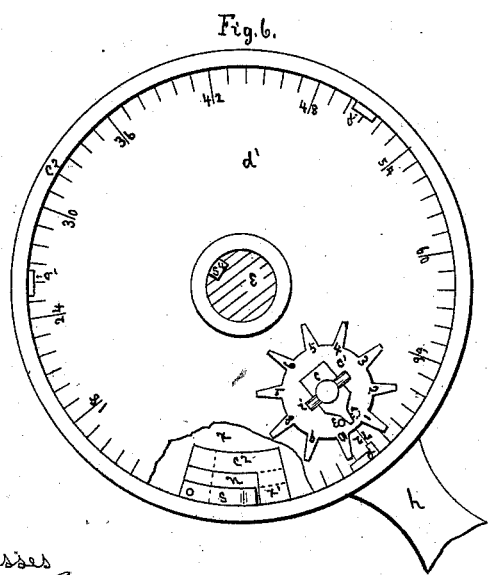
Witnesses
O. P. Sperra
Geo. F. Robinson
Inventors
Andrew J. Johnson
Charles O. Evarts
by Bradford Howland
their Attorney.

UNITED STATES PATENT OFFICE.

ANDREW J. JOHNSON AND CHARLES O. EVARTS, OF CLEVELAND, OHIO.

IMPROVEMENT IN MEASURING AND INDICATING FAUCETS.

Specification forming part of Letters Patent No. 201,533, dated March 19, 1878; application filed December 31, 1877.

*To all whom it may concern:*

Be it known that we, ANDREW J. JOHNSON and CHARLES O. EVARTS, of Cleveland, Ohio, have invented a new and useful Improvement in Indicating-Faucets, which improvement is fully described in the following specification, reference being had to the accompanying drawings.

The object of our invention is to indicate automatically, by means of a dial and index connected with the cock of a measuring-faucet, the quantity of liquid drawn through the faucet, the indicating device being so arranged and inclosed that the operator cannot tamper with it without detection.

Figure 1 is a front elevation. Fig. 2 is a longitudinal section. Fig. 3 is a cross-section. Fig. 4 represents a part of the indicating device. Fig. 5 is a section of the cock at the dotted line in Fig. 3. Fig. 6 shows parts of the indicating device.

The tube $t$ connects the faucet with a vessel from which the liquid is to be drawn. When handle $h$ and cock $a^1$ are in the positions indicated by dotted lines in Figs. 1 and 2 the liquid flows from tube $t$ through the way $w$ in cock $a^1$ and slot $a^2$, through the bottom $b^1$, into the measure $m$. As the liquid rises in measure $m$ the air escapes through the vent $v$, the lower side of which is concave. When measure $m$ is nearly filled the spherical float $d$, which is supported by wires $f\ f$ attached to vent $v$, floats on the liquid and rises with it till measure $m$ is full, and float $d$ closes the aperture of vent $v$, and prevents the liquid from rising through it. The vent $v$ has a perforated cover, $a$, to prevent extraneous substances from entering the measure through the vent. The vent $v$ is circular, having a lower flange, and is kept in position by band $b$ around its upper end, and which also attaches cover $a$ to the vent. The float $d$ may be of cork, hollow rubber, or other suitable material that will float.

The measure $m$ is circular, its lower side projecting slightly under the top of the threaded ring $g$, so that when ring $g$ is screwed on the threaded circumference of bottom $b^1$ the measure $m$ and its bottom $b^1$ are held in close contact. The measure is of glass, but may be of any suitable material, and may be removed for the purpose of cleaning it, by unscrewing ring $g$. The bottom $b^1$ is attached to and forms a part of box $b^2$, in which cock $a^1$ turns. By turning cock $a^1$ to the position shown in Fig. 2, the liquid flows out of measure $m$ through slot $a^2$, way $w$, and spout $a^3$, while float $d$ sinks till it rests on wires $f\ f$. The turning of cock $a^1$ (except sufficiently to fill and empty measure $m$) is arrested by pin $o^2$, Fig. 5, in the side of the cock coming in contact with the ends of a slot in box $b^2$. This pin at one end of the box, and the disk $c^4$ and screw $s^3$ at the other end, keep cock $a^1$ in position. The shaft $e$ is keyed in cock $a^1$ by key $a^4$. On this shaft are the cap $c^2$, disk $x$, and dial $d'$. The cap $c^2$ is loose on shaft $e$, and extends over the flange on cock $a^1$, and incloses disk $x$ and dial $d'$. Cap $c^2$ is prevented from sliding on shaft $e$ by disk $x$, keyed to the shaft by key $s^4$, and disk $c^3$, held against the end of the shaft by screw $s^2$. Dial $d'$ is loose on shaft $e$. It has ratchet-teeth surrounding it at its circumference on the side contiguous to disk $x$, and on the opposite side it is marked with index-lines conforming to the spaces between the ratchet-teeth. It is turned by a spring-pawl, $s$, attached to a lug, $n$, on the interior face of cap $c^2$, and extending through a slot, $x'$, in disk $x$. The length of slot $x'$ exceeds the length of lug $n$ by a little more than the space of a tooth on the dial-ratchet.

When handle $h$, Fig. 4, is being turned to the right, the cap $c^2$, to which it is attached or forms a part of, turns loose on its shaft, and pawl $s$ turns dial $d'$ till lug $n$ comes in contact with the end of slot $x'$. Disk $x$ being keyed to its shaft, in the meantime remains stationary, and a tooth of the ratchet on dial $d'$ passes over spring-pawl $s^1$, which is attached to disk $x$. Then lug $n$, by pressing against the end of slot $x'$, turns disk $x$, dial $d'$, and cock $a^1$ till in the position shown by dotted lines in Figs. 1 and 2.

When handle $h$ is being turned to the left to empty measure $m$, cap $c^2$ turns loose till lug $n$ comes in contact with the end of slot $x'$, as shown in Figs. 4 and 6, the disk $x$ in the meantime remaining stationary, and pawl $s^1$ holding dial $d'$ from turning, while spring-pawl $s$ slips over a tooth of the ratchet. Then cap $c^2$ continues to turn, carrying disk $x$, dial $d'$, and cock $a^1$ till in the position shown in the drawings.

The dial $d'$ is pressed against spring-pawls $s$ $s^1$ by contact of its hub with the end of cock $a^1$ and by the guides $o$ $o^1$ $o^1$ attached to cap $c^2$, so that the friction is sufficient to carry the dial with disk $x$ and cap $c^2$. Thus, every time measure $m$ is filled and emptied, dial $d'$ is turned on its shaft the space of one tooth of the ratchet. The index-wheel $c^1$ is turned on a pin in dial $d'$ the space of one tooth of the wheel, by contact of the tooth with a slight projection on guide $o$ at each revolution of dial $d'$ on its shaft. The friction of wheel $c^1$ against spring $c$ on the pin of the wheel is prevented from turning the spring by a slight groove across the top of spring $c$, in which linchpin $i$ rests; but when wheel $c^1$ has made nearly a revolution, and pin $e'$ in wheel $c^1$ has reached the position shown by dotted lines in Fig. 6, the pin $e'$ will turn the spring with the wheel, and thus indicate, when the dial is removed for inspection, that wheel $c^1$ has made a revolution. In the drawings, the teeth of wheel $c^1$ are numbered from 1 to 10 inclusive, and the index of dial $d'$ is divided into seventy-two spaces, there being a like number of ratchet-teeth on the opposite side.

When dial $d'$ has been placed in cap $c^2$, in the position shown in Fig. 6, with the projection of guide $o$ directly over index-line 72, and between teeth 1 and 10 of index-wheel $c^1$, the cap, disk, and dial are placed on shaft $e$, and the disk $c^3$ fastened against the end of the shaft by screw $s^2$. A seal may then be placed over the end of disk $c^3$ and the screw, so that the dial cannot be removed from the shaft or tampered with without detection.

When measure $m$ has been filled and emptied seventy-two times, dial $d'$ will have made one revolution, and wheel $c^1$ will have turned the space of one tooth. When wheel $c^1$ has made one revolution it will be shown by spring $c$ having been slightly turned from its former position under the linchpin $i$ by pin $e'$, and will indicate that dial $d'$ has made ten revolutions, and that measure $m$ has been emptied seven hundred and twenty times.

To ascertain the quantity of liquid drawn, the seal over the head of screw $s^2$ may be removed and cap $c^2$, with dial $d'$, taken from shaft $e$, and the dial inspected.

There may be as many ratchet-teeth on dial $d'$ and as many index-teeth in wheel $c^1$ as may be desirable.

We claim as our invention—

1. A measuring-faucet with the indicating-dial $d'$, having a ratchet, in combination with pawl $s$, lug $n$, cap $c^2$, handle $h$, and slot $x'$ in disk $x$, connected with faucet-cock $a^1$, substantially as described.

2. The cock $a^1$, having the shank or shaft $e$, in combination with cap $c^2$, having lug $n$ and pawl $s$, disk $x$ having pawl $s^1$ and slot $x'$, and dial $d'$ having a ratchet, all arranged to operate substantially as described.

3. The index-wheel $c^1$, in combination with the projection of guide $o$, dial $d'$, pawls $s$ $s^1$, disk $x$, cap $c^2$, and cock $a^1$, substantially as described.

4. The grooved spring $c$, in combination with pins $i$ and $e'$, index-wheel $c^1$, and rotating dial $d'$, substantially as described.

ANDREW J. JOHNSON.
CHARLES O. EVARTS.

Witnesses:
F. NICOLO,
N. C. WELCH.